United States Patent [19]

Brown

[11] 3,925,130

[45] Dec. 9, 1975

[54] PRODUCTION OF BONDED FIBROUS PRODUCTS

[75] Inventor: Robert Brown, Kirkcaldy, Scotland

[73] Assignee: Nairn Floors Limited, Lune Mills, England

[22] Filed: May 18, 1973

[21] Appl. No.: 361,702

[30] Foreign Application Priority Data
May 31, 1972 United Kingdom.............. 25541/72
Jan. 29, 1973 United Kingdom................ 4483/73

[52] U.S. Cl. ............ 156/148; 28/72 P; 28/72 NW; 28/72.2 R; 28/74 P; 156/181; 156/305; 156/306; 428/96; 428/235
[51] Int. Cl.²............................................ B32B 5/02
[58] Field of Search ............ 156/72, 148, 166, 176, 156/177, 178, 180, 181, 305, 306; 161/150, 62, 67, 65, 66, 80, 81, 82, 88, 151, 154; 28/72 P, 72.2 R, 73, 76 R, 72 NW, 74 P

[56] References Cited
UNITED STATES PATENTS

| | | | |
|---|---|---|---|
| 2,869,973 | 1/1959 | Hubbard et al.................. | 161/150 |
| 3,476,636 | 11/1969 | Crosby............................... | 156/148 |
| 3,574,523 | 4/1971 | Hudson et al...................... | 161/150 |
| 3,663,329 | 5/1972 | Rossmann.......................... | 156/148 |
| 3,717,524 | 2/1973 | Culp et al. ........................ | 156/72 |
| 3,776,799 | 12/1973 | Gruber et al. ..................... | 156/148 |

FOREIGN PATENTS OR APPLICATIONS

| | | | |
|---|---|---|---|
| 747,100 | 11/1966 | Canada............................. | 156/148 |
| 1,152,667 | 5/1969 | United Kingdom | |

*Primary Examiner*—Charles E. Van Horn
*Assistant Examiner*—F. Frisenda
*Attorney, Agent, or Firm*—Lawrence Rosen; E. Janet Berry

[57] ABSTRACT

Methods are described of bonding needled non woven carpets having a pile. At least the pile is impregnated with a solution of a tackifying agent that has no tackifying effect at its concentration in the solution and the web is then heated while uncompressed to evaporate solvent and thereby accumulate tackifying agent at fibre intersections and tackify the fibres at the intersections.

11 Claims, No Drawings

PRODUCTION OF BONDED FIBROUS PRODUCTS

It is well known to form non woven carpets by needling a web of fibres. Traditionally such carpets have had a surface having substantially no pile on it. However in recent years it has become well known to so needle the web of fibres as to give the surface significant pile as a result of which it has a textured effect. For example the needling may result in the surface of the web having a fairly uniform but deep pile or an embossed appearance, the needled web then having an appearance very similar to a conventional tufted or woven carpet.

Unless the needled carpet is bonded in some manner the pile will flatten and the textured surface effect will soon be lost, at least to some extent, during use. Also it is necessary to bond the fibres in the base, i.e. in the part beneath the pile, to strengthen the base and to hold the pile fibres in position.

The standard method of bonding needled carpets comprise impregnation with a latex but if this is used on needled carpets having a pile surface then the pile is lost or the surface is otherwise impaired.

A wide variety of methods of bonding fibres together in non woven fabrics in general are known. Impregnation with a latex or other liquid bonding agent is probably the most common.

Another method comprises softening by the action of steam water softenable fibres in a web. In practice this method is limited to webs containing polyvinyl alcohol or alginate fibres and suffers from the additional disadvantage that the fibres must subsequently be insolubilized for many purposes.

Another method comprises fusing thermoplastic fibres in the web, the thermoplastic material of the fibres thus serving as the bonding agent. In practice the fused fibres usually account for only a small proportion of the total amount of fibres in the web and the fibrous nature of the fused material is usually completely destroyed. For various reasons this method is not commercially satisfactory for many purposes.

Various proposals have been made from time to time to bond fabrics by applying to the fabric a material that is often referred to as a "latent fibre solvent". A wide variety of latent fibre solvents have been mentioned in the literature and such references are to be found in, for example, British Patent Specifications Nos. 911,282, 918,632 and 1,152,667, U.S. Pat. Nos. 3,574,523, 2,869,973 and in TAPPI May 1955 Volume 38 pages 257 to 261. A wide variety of latent fibre solvents are mentioned in these documents and they range from, for example, inorganic salts such as zinc chloride and lithium thiocyanate to organic liquids such as tetramethylene sulphone and certain phenols. Despite the extensive listing of latent fibre solvents for various fibres in fact it seems as if this method of bonding has not been adopted on any wide scale and it seems as if this method has been found to be of little commercial utility.

More recently processes have been proposed in which a web is formed of multi-component fibres, i.e. fibres composed of two or more parts each made of a different polymeric material, and is fused at a temperature such that one of the polymeric materials melts while the other does not. For example the multi-component fibres most readily available at present for use in this method have a core of nylon 66 and a sheath of nylon 6. Upon heating to a temperature between the melting point of nylon 6 and nylon 66 the nylon 6 melts and forms a bond at the intersection of the fibres that remain, i.e. of the fibres of nylon 66. Although this method can be used to form satisfactory webs it suffers from the disadvantage that special fibres, i.e. the bi-component fibres, are necessary for it and that conventional mono-component fibres cannot be used except in combination with quite large amounts, for example at least 50%, of the bi-component fibres. One result of this is that it tends to make the product very expensive. A most important disadvantage is that, the method requires the fibres to be heated to high temperatures. Many dyes, especially pastel shades, are damaged by this heating. Also it is impossible to formulate several fibre types into bi-component fibres because of heat instability or their melting point. In fact at present only polyamide bi-component fibres are available.

Despite these disadvantages a preferred method of bonding needled carpets having a pile surface is by heat bonding of these bi-component fibres. They stabilise the pile very well and, apart from the mentioned disadvantages, are generally satisfactory.

We have now surprisingly found that if we choose particular methods of applying particular classes of latent fibre solvents the advantages obtainable with bi-component fibres can be achieved without the disadvantage of the high cost of the starting materials, damage to dyes and the restriction on the fibre materials that can be used.

According to one aspect of the invention a needled non woven carpet having a pile surface is made by a method comprising needling a web of fibres to form the desired surface pile, impregnating at least the pile of the needled web with an aqueous solution of a tackifying agent that has substantially no tackifying effect on the fibres below their normal melting point at its concentration in the solution but which does tackify them at a temperature below 120°C when present in a solution of higher concentration, heating the web while uncompressed to evaporate water and thereby accumulate solution at fibre intersections and tackify the fibres, and subsequently solidifying the fibres and removing the remainder of the water.

This solidification of the fibres and removal of water may be done in either order. Generally it is effected by further heating of the web.

Thus in a preferred process after applying to the web a solution that is too dilute for tackifying the fibres the web is heated to cause complete evaporation of the water. During the heating step the aqueous solution concentrates and accumulates at the fibre intersection. Tackifiable fibres in the web become tacky at the intersections. Further evaporation causes resolidification. Any remaining water is evaporated. Naturally the evaporation conditions, for example the temperature, the rate of air flow, if any, through the web during evaporation, and the duration of heating will be selected to permit a satisfactory amount of bonding to occur. Obviously if the conditions are such that extremely rapid evaporation occurs in some instances the bonding obtained may be less satisfactory than when slower evaporation occurs.

The tackifying agents used in this aspect of the invention are a very narrow selection of all the latent fibre solvents that have been proposed previously. Many of the latent fibre solvents that have been proposed previously do in practice exert their tackifying effect only after the water has been driven off. Thus many of the known latent fibre solvents only exert their tackifying effect only at rather high temperatures, for example temperatures above 140°C and often above 160°C. This is demonstrated by the fact that it seems that the best way of using tetramethylene sulphone is to apply it as an aqueous solution, to heat at a temperature of, say 100° to 120°C to drive off the water (during which heating no tackifying occurs) and subsequently to heat to a much higher temperature to bring about tackifying. The result of having to heat to temperatures significantly in excess of 120°C to achieve tackifying is that the method is not applicable if the web fibres are dyed with heat sensitive dyes or if the fibres themselves are liable to be degraded by heat. For example the method is not very satisfactory if polypropylene fibres are present since they tend to be damaged by high temperatures.

By using latent fibre solvents that exert their tackifying effect at temperatures below 120°C or lower, e.g. below 105°C, tackifying can occur while they are still in aqueous solution, all these disadvantages are avoided, and yet we still obtain the most surprising result that the pile carpets are as good as or better than the pile carpets made using bi-component fibres. Of course not all fibres or dyed fibres are heat sensitive and so in the invention it is not essential to carry out the process below 120°C and often heating is conducted at temperatures of, for example 140° to 160°C.

The preferred tackifying agents for use in this aspect of the invention are salts, preferably inorganic and hydroxy carboxylic acids, particularly aliphatic ones, preferably containing 2 to 10, more preferably 3 to 6, carbon atoms. Naturally the tackifying agents must be soluble in water.

Acids and salts of the types indicated above in general have the advantages of being relatively cheap, of having little or no odour and of giving rise to no or few toxicity problems, compared with many latent fibre solvents that have been proposed e.g. tetramethylene sulphone.

The salts that are used are preferably salts of strong acids, i.e. acids that will ionise substantially completely in solution. They are salts of organic or, preferably, inorganic acids with organic or, preferably, inorganic bases.

Examples of suitable fibres and of suitable salt solutions are given in the patent specifications mentioned above also also in TAPPI May 1955 volume 38 pages 257 to 261. Reference should be had to these specifications and article for a description of suitable combinations. Particularly preferred salts, that are applicable on many fibres, are halides, especially bromides, chlorides and iodides, and thiocyanates of a wide variety of metals, especially metals having atomic numbers of up to 48. Certain nitrates and sulphates may also be used, for example ferrous sulphate and ferric nitrate. Also ammonium salts may be used, for example ammonium thiocyanate, as also may organic salts. Soluble organic salts include pyridinium chloride and sodium thioglycollate.

Hydroxy carboxylic acids that can be used include alpha hydroxy carboxylic acids such as lactic acid and glycolic acid, beta hydroxy carboxylic acids, such as 3-hydroxypropionic acid, and gamma hydroxy carboxylic acids, such as 4-hydroxypropionic acid. Of the acids, lactic acid is generally preferred.

With many of the tackifying agents suitable for use, and in particular when a tackifying agent is a salt, solidification of the fibres usually occurs while the fibres are still in contact with the tackifying agent. This method is therefore additionally to be distinguished from methods in which, for example, a volatile organic material is used to soften fibres below their normal melting point and solidification is then brought about by driving off the organic material by heating. Such methods generally involve the need for, for example, solvent recovery plants. It is a particular advantage of this aspect of the invention that one does not use any volatile organic solvents and so there is no need to provide large scale solvent recovery plants. Hydroxy carboxylic acids used in the invention may finally be removed from the web by evaporation but their loss to the atmosphere can be tolerated and in any event recovery of the small quantities involved is relatively easy.

It may sometimes be desirable to remove the tackifying agent by washing after the fibres have resolidified, especially when it is a salt, but of course it is then relatively easy to extract the tackifying agent from the wash liquors and, optionally, recycle it.

The most critical part of the bonding of the needled carpet is the bonding that occurs in the pile. Thus although it is essential that the base of the carpet also be bonded the success or failure of any particular bonding method is determined to a large extent by the effect on the pile. Accordingly it is essential in the invention at least to impregnate the pile with the specified solutions. The simplest way of doing this is to impregnate the whole web in a single impregnation method, for example by dipping the web in a bath of the solution or by applying the solution by a padding roll or a mangle. We find surprisingly that such methods sometimes give very satisfactory bonding in the base of the web but less satisfactory bonding in the pile. We have surprisingly found that we can overcome this difficulty if, instead of using what might be considered to be conventional web application methods, we apply some at least of the solution direct onto the pile either by spraying or as a thickened or foamed solution. By choosing the spray conditions or the viscosity appropriately it is easily possible to ensure that a substantial amount remains on the pile, that is to say that sufficient remains on the pile to give the degree of bonding required.

This effect can be achieved by a single application of solution but preferably solution is applied in two stages, some being applied to the web from the base side, often by spraying or as a thickened or foamed solution, and the remainder being applied onto the pile by spraying or as a thickened or foamed solution. For example from 40 to 95%, and most preferably from 60 to 80% (for example 75%), by weight of the total amount of solution may be applied from the base side with the remainder of the solution being applied direct onto the pile.

A second aspect of the invention resides in this particular method of application and is not restricted to the use of the particular tackifying agents mentioned above that are capable of tackifying while in solution at a temperature below 120°C. Instead any solution of any tackifying agent that has no tackifying effect at its concentration in the initial solution but which does tackify the fibres below their normal melting point when some or all of the solvent of the solution has been evaporated may be used.

For example, instead of using water alone as the solvent organic solvents or, more usually, mixtures of water and organic solvents may be used. Most particularly aqueous alcoholic solutions may be used as the solvent for the tackifying agent. Tackifying agents that may be used include the salts and hydroxy carboxylic acids discussed above together with many other compounds including those disclosed in the specifications mentioned above. Examples are sulphoacetic acid, mercapto acetic acid, such as thiolactic acid, thioglycolic acid and 3-mercapto propionic acid, propylene carbonate, ethylene cyano hydrin, mimethyl acetamide, dichloro acetic acid, trichloro acetic acid, urea, benzyl alcohol, dimethyl formamide, dimethyl acetamide, nitric acid, formic acid, phenol and various substituted phenols such as 2,4-dichlorophenol, meta cresol, catechol, resorcinol, hydroquinone, pyrogallol, alpha or beta naphthol, o,o-biphenol,2,2'-bis-p(hydroxyphenyl)propane, 3,5-dihydroxy toluene and 5-hydroxy-2-hexylphenol.

When a solution is being sprayed onto the web in such a manner that a substantial proportion of the solution remains in the pile the method of spraying and the components of the solution will be selected by routine experiment to give optimum results. For example it may be necessary to include some surface active agent to improve wetting of the fibres by the solution and to promote accumulation of the solution at fibre intersections upon heating, but if too much surface active agent is used then the solution may flow too readily into the base of the web.

Any convenient surface active agent may be used. Suitable surface active agents for acidic systems include nonyl phenol ethoxylates and sulphosuccinic derivatives. The droplet size of the sprayed particles will generally be fairly fine, for example an average of 0.160 millimeters. The pressure of spraying will normally be fairly high but should not be so high as to compress the pile significantly. For example the pressure may be 40 psi at the outlet from the spray gun which may be 2 feet from the pile.

If, instead of spraying onto the pile, a thickened or foamed solution is being applied, then this application may be, for example, by a padding roll, by dipping with the pile exposed to the solution, or by passage through a mangle or under a doctor blade. Any pressure applied to the pile should be low, so as to avoid compressing the pile to any significant extent. The degree of foaming or thickening will be chosen having regard to the pentration required. Foams and thickened compositions may be formed in conventional manner. Suitable thickening agents include polyvinyl alcohols. If the solution is to be foamed then it may not be necessary to have a thickening agent and instead it would be significant to include a foam stabilizer. Suitable materials include nonyl phenyl ethenylates.

Whatever the tackifying agent and whatever the method of application to the web the amount of solution applied to the web is generally from 100 to 300% based on the weight of fibres. Most preferably it is from 150 to 250%, with best results generally being obtained at about 200%.

Instead of achieving bonding in the base and in the pile by the use of tackifying agent solution, bonding in the base may be by any other suitable method. For example latex may be applied to the back to impregnate through and bond the base only and the sprayed, thickened or foamed solution of tackifying agent may be applied to the pile before or after this.

It is desirable that the concentration of the solution applied initially to the fabric should have to be increased substantially before the fibres become tacky, for example at least half the solvent initially present having to be removed before the fibres become tacky. As an example, many suitable solutions render the fibres tacky at a concentration of about 30%, and it is convenient to apply the agent initially at concentration of 3 to 15%, preferably 3 to 10 and most preferably 7 to 10%. The concentration of the solution before tackifying occurs results in the solution accumulating at fibre intersections and as a result tackification and bonding occurs substantially only at the fibre intersections. This results in a product of improved quality compared to that obtainable when the fibres are tackified over their entire length.

The web needs to be heated while uncompressed, to bring about concentration, accumulation and tackification, as otherwise the pile may be damaged. For example the web may be dried in an oven and is preferably carried through the oven on a preforated conveyor, for example a wire conveyor, in order to keep it flat. The drying temperature in the oven may be, for example, between 100° and 200°C, preferably 140° to 180°C and the solvent is water. Suitable temperatures for other solvents will be found by experiment and, naturally, if the solvent is more volatile than water suitable temperatures will generally be lower than those indicated for water. Dwell time in the oven or other drying zone will depend, inter alia, on the temperature, the solution concentration and whether there is any air flow, but is generally from half a minute to half an hour, preferably 2 to 5 minutes.

With most at least of the tackifying agents by the time the web is substantially dry the dissolving or other tackifying effect on the tackified fibres will have been eliminated and the fibres will thus have resolidified and will have bonded at their intersections with fibres with which they are in contact. The web will often still contain the tackifying agent and this may then be removed, generally by washing with water or other solvent. Washing may be achieved by soaking the web in water and draining or squeezing the water out of the web and usually repeating the process one or more times. The resulting product is then dried.

The web that is bonded by the method of the invention may consist of a single fibre type, with the result that all of the fibres in the web will be tackified and resolidified, or it may comprise a mixture of fibres that are tackified and resolidified with other fibres which are substantially unaffected by the salt solution. The web may include fibres that are softened to different degrees by the solution used, or that are softened by different solutions, so that application of one solution to soften one fibre type may be followed by application of another solution to soften another fibre type. It is generally desirable that the amount of tackifiable fibres in the web should be at least 50%.

The initial needled web may be formed in any conventional manner. Thus a fleece of fibres may be formed by, for example, a card and, optionally, crosslapper, or by a Rando Webber or any other convenient method of forming a fleece by air laying and the fleece may then be needled in one or more looms that may be of single or multi-punch construction or may be of special design for producing a pile surface. Usually the web is first needled with a loom of conventional construction and is then needled with a loom designed to produce a pile surface. Needle looms designed to produce such surface effects are commercially available. They, and processes of using them, are described in for example Tufting & Needling News Bulletin, May 1971. The pile surface obtained have have an appearance very similar to that of conventional tufted or woven carpets. The pile usually accounts for a substantial proportion, usually at least 10% by weight and often at least 25% by weight, of the total weight of fibres in the needled carpet. Expressed another way, the thickness of the pile is usually at least 20% and often at least 50% of the total thickness of the needled carpet.

Compared to conventional tufted or woven carpets the pile density is low. For example the weight of fibres in the pile may be from 40 to 40 grams per millimetre pile thickness per square metre whereas conventional tufted or woven carpets usually have from 100 to 300 grams per millimetre pile thickness per square metre. Despite this low pile density it is possible to obtain products that have pile properties comparable with those of conventional tufted or woven carpets.

The weight of fibres in the needled web will normally be from 250 to 1500, and most preferably from 500 to 1000, grams fibres per square metre.

The fibres of which the web are formed may initially be dyed, in which event the product will generally be correspondingly dyed. However the application of salt solution as the tackifying agent and subsequent washing of this may result in some change of colour, and in particular some whitening at fibre intersections, and if this is liable to happen for any particular combination of dye and fibre it is desirable to piece dye the resultant bonded product. If piece dyeing is to be conducted then it is usually unnecessary to use dyed fibres in the first place. The product may be printed or patterned dyed to give a single colour or multicolour product.

Products made by the invention may be subjected to any other desired treatments. For example they may be given a backing for example a foam backing or a solid backing. Floor coverings may be sold in roll form or may be cut into tiles. The surface of the product may also be subjected to finishing processes such as embossed texturising or tip shearing. Although very satisfactory bonding can be obtained by the method of the invention it may occasionally be desirable to bond the fabric also in some other manner, for example by impregnation with a latex from the back of the web.

A variety of fibres may be bonded in accordance with the invention. Naturally not all tackifiable fibres can be rendered tacky by all possible tackifying agents and suitable combinations have to be selected, many such combinations being discussed in the documents mentioned previously. Many tackifiable fibres used in the invention are synthetic organic polymeric materials although wool and other natural fibres can be used. Suitable synthetic organic polymers include polyolefins, especially polypropylene, polyesters, polyamides, polyacrylates, (that is to say polyacrylonitriles) and the modified versions of these known as modacrylics, cellulose diacetate, cellulose triacetate and polyurethane fibres. Of these polyamides are generally preferred as the tackifiable fibre. If the fibre does not normally contain a polar group, for example a polyolefin or polyester, then it may be convenient to modify the fibre before use, in a manner conventional for improving its dyeability properties, so as to improve its ability to be tackified. For example polar groups may be introduced into, for example, polypropylene, for example by grafting.

Included amongst the combinations of fibre type and tackifying agent that have been tested for use in the invention and which have been found to be particularly satisfactory are the following:

Polyamide fibres: zinc chloride, bromide and iodide, cobalt lithium and cadmium iodide, lithium thiocyanate, nitric acid, ferric chloride, calcium bromide and thiocyanate, lactic acid, thioglycolic acid, dichloroacetic acid, phenol, 2,4-dichlorophenol, glycolic acid, 3-hydroxypropionic acid, thiolactic acid, 3-mercapto propionic acid, sulphoacetic acid, glyceric acid and meta cresol.

Polyester fibres: meta cresol, 2:4-dichlorophenol, phenol and dichloroacetic acid.

Polypropylene fibres: calcium thiocyanate, lithium bromide and the thioglycolic acid.

Acrylic fibres: zinc iodide, chloride and bromide, potassium thiocyanate, calcium thiocyanate, cobaltous iodide, pyridinium chloride, ethylene carbonate, propylene carbonate, ethylene cyanohydrin, dimethylacetamide, sodium thioglycolate, phenol, dichloroacetic acid and thioglycolic acid.

Polyurethane fibres: calcium iodide, calcium thiocyanate, ferric chloride, ferric nitrate, zinc and lithium iodide and lactic acid.

Cotton fibres: calcium thiocyanate and sodium bromide.

Rayon fibres: lithium thiocyanate.

Cellulose diacetate fibres: zinc chloride or iodide and lithium iodide or lactic acid, ethylene cyanohydrin, ethylene carbonate, propylene carbonate, thioglycollic acid.

Cellulose triacetate fibres: zinc iodide, thioglycollic acid.

Modacrylic fibres: zinc chloride, nitric acid, ethylene cyanhydrin, thioglycollic acid.

Silk fibres: zinc iodide, magnesium chloride, KCNS, urea diacetone alcohol.

Wool fibres: lactic acid, thioglycollic acid.

Many other suitable combinations can also be selected.

EXAMPLE 1

A fleece of polyamide fibres may be formed by a card and weighed about 650 grams per square meter. It was then subjected to needling on a conventional needle loom and then on a needle loom designed to produce a needled product having a pile surface. The resultant pile web had about 60% of its thickness in the pile. It was saturated with 10% aqueous zinc chloride solution at room temperature and then carried on a wire mesh conveyor through an oven maintained at 160°C. After it was dry it was washed with water several times to remove zinc chloride and was then dried again at 160°C.

The resultant product was a firmly bonded web having a pile that has substantially the same appearance as the pile in the web before impregnation with the salt solution but which was fairly resistant to matting.

EXAMPLE 2

A fleece of nylon 6 fibres was formed by a card and weighed about 650 grams per square meter. It was then subjected to needling on a conventional needle loom and then on a needle loom designed to produce a needled product having a pile surface. The resultant pile web was saturated with a 10% aqueous solution of lactic acid at room temperature and then mangled to remove excess solution on conventional impregnating apparatus. The wet fleece was then carried on a wire mesh conveyor through an oven maintained at 160°C. After it was dry it was washed with water several times to remove free lactic acid, amounting to about 5% of the amount applied, and was then dried again at 160°C.

EXAMPLE 3

The web described in Example 1 was saturated with 10% aqueous zinc chloride solution at room temperature by a two stage spraying operation. First a pick up of 150% based on the fibre weight was achieved by spraying from the base side and then a pick up of a further 50% was achieved by spraying from the pile side. The wet fleece was then carried on a wire mesh conveyor through an oven maintained at 160°C and after it was dry it was washed to remove zinc chloride and then dried again to 160°C.

The resultant product was a firmly bonded web having a pile that had substantially the same appearance as the pile in the web before impregnation but which was very resistant to matting.

EXAMPLE 4

The process of Example 3 may be repeated except that instead of spraying in the amount specified the web may first be padded from the base side in the solution to provide a 150% pick up and may then have padded onto the pile side to produce a 50% pick up a foam obtained by whisking air into the same solution but to which has been added nonyl phenol ethoxylate as a foam stabiliser.

EXAMPLE 5

The process of Example 4 may be repeated except that instead of applying the solution to a surface as a foam it may be applied as a thickened solution containing 5% of polyvinyl alcohol as a thickener.

EXAMPLE 6

The process of Example 5 may be repeated using polypropylene fibres instead of polyamide fibres, calcium thiocyanate instead of lactic acid as the tackifying agent and a drying temperature of 120°C instead of 160°C.

EXAMPLE 7

The process of Example 4 may be repeated using polyacrylonitrile fibres instead of polyamide fibres and potassium thiocyanate instead of zinc chloride.

EXAMPLE 8

The process of Example 3 may be repeated using polyethylene terephthalate fibres instead of polyamide fibres and a 10% solution of meta cresol in a 50:50 aqueous ethanol solution instead of the aqueous zinc chloride solution, and a drying temperature of 100°C instead of 160°C.

EXAMPLE 9

The process of Example 3 has been repeated using a fleece having a fibre weight of 650 grams per square meter consisting of 60% nylon fibres and 40% polyester fibres.

EXAMPLE 10

To compare the properties of carpets made in accordance with the invention with carpets made by the much more expensive and limited process using bicomponent fibres the proccess of Example 3 was repeated save that the web was formed of 60% bicomponent nylon fibres and 40% polyester fibres. The process of Example 3 was also repeated using this fibre mixture but using also a 10% aqueous lactic acid solution instead of the zinc chloride solution.

As comparisons, in one test the same needled web was heated to achieve conventional heat bonding and in another test the same fibre web was impregnated with a latex.

The four different carpets were then compared for various properties, including static load, percentage recovery and dynamic load percentage gauge loss, flattening and soilability. It was found that the latex impregnated material soiled most readily and was generally unsatisfactory while the two products of the invention were comparable, and in may respects better, than either the latex impregnated material or the heat bonded material.

The product obtained in the Examples are suitable for use, in a roll, as floor covering or could be formed into floor tiles having a bitumen or thermoplastic backing by conventional methods.

I claim:

1. A process of making a needled non-woven carpet having a pile surface comprising the steps of (1) needling a web containing at least 250 g/m$^2$ fibres of which at least 50% are tackifiable fibres having a melting point above 160°C. and forming on a surface of the web by the needling a pile which contains at least 10% by weight of the fibres in the web and which is at least 20% of the total thickness of the web to form a pile surface, (2) impregnating at least the entire pile of the needled web by applying direct onto the pile from 100 to 300% by weight of fibres in the web of an aqueous solution containing 3 to 30% by weight of a tackifying agent that has substantially no tackifying effect on the tackifiable fibres below said melting point at its concentration in the solution but which does have a tackifying effect at a temperature below 120°C. when present in a solution of higher concentration, (3) heating the web while uncompressed to a temperature of 100° to 200°C. for half a minute to half an hour to evaporate water and thereby to accumulate solution at fibres intersections and to concentrate the solution sufficiently to tackify the tackifiable fibres of the intersections throughout the pile and subsequently to solidify the fibres, and (4) washing the web to remove tackifying agent.

2. A process according to claim 1, in which the tackifying agent is a salt of an inorganic or organic acid with an inorganic or organic base, or an aliphatic hydroxy carboxylic acid containing less than 10 carbon atoms.

3. A process according to claim 1 in which the tackifying agent is selected from the group consisting of zinc chloride, zinc iodide, zinc bromide and lactic acid.

4. A process according to claim 1 in which the web comprises polyamide fibres.

5. A process according to claim 1 in which the direct application of the solution onto the pile is by spraying or as a thickened or foamed solution under conditions such that a substantial proportion remains preferentially on the pile.

6. A process according to claim 1 in which some of the solution is applied to the web from the base and further solution is then sprayed or applied as a thickened or foamed solution direct onto the pile.

7. A process according to claim 1 in which from 50 to 80% of the solution is applied to the base and the remainder is then applied direct to the pile by spray or as a thickened or foamed solution.

8. A process according to claim 1 in which the aqueous solution of tackifying agent is applied to the web without any substantial pressure, thereby avoiding significant compression of the pile, and the washing is conducted by soaking the web in water and draining the resulting product.

9. A process according to claim 1 in which the pile that is formed by the needling contains at least 25% by weight of the fibres of the web and at least 50% of the total thickness of the web.

10. A process according to claim 1 in which the web contains at least 500 g/m$^2$ fibres.

11. A process according to claim 1 in which the tackifiable fibres are polyamide and the tackifying agent is lactic acid.

* * * * *